Patented Mar. 8, 1949

2,463,666

UNITED STATES PATENT OFFICE 2,463,666

NICOTINIUM SALTS AND THEIR PRODUCTION

Charles F. Woodward, Abington, and Leopold Weil, Philadelphia, Pa., assignors to the United States of America as represented by the Secretary of Agriculture No Drawing. Application October 4, 1944, Serial No. 557,213

5 Claims. (Cl. 260—291)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to derivatives of nicotine and a process for their preparation, and also to insecticides employing these derivatives as the essential active ingredients.

Although nicotine is an effective devitalizing agent for many soft-bodied insects, it has several undesirable properties. Unless precautionary measures are taken, it is readily lost from plant surfaces by evaporation. This volatilization loss has been reduced in the prior art by combining the nicotine with suitable materials which form nicotine compositions having little or no volatility. Also, the extreme solubility of nicotine in water increases the difficulty of retaining a lasting deposit free on plant surfaces and appreciable losses of nicotine are known to occur during heavy dews or rains.

When used in an oil and water emulsion base, which is the preferred method of application of a contact insecticide, the insecticide used should desirably be soluble in the oil and insoluble in the water, since it is the oil which assists the insecticide by penetrating the waxy protective coating of the insect. Nicotine, however, being soluble in the water, is, therefore, also defective when used in this manner.

It is known that the effectiveness of water-soluble insecticides, such as nicotine, can be enhanced by incorporating emulsifying agents, such as detergents or soaps, in the aqueous solution of the insecticide. These agents aid in the penetration and retention of the insecticide on the surface of the insect.

The present invention has as its objective the preparation of non-volatile nicotine compounds having soap-like properties in themselves. They are, therefore, particularly useful as insecticidal ingredients, since no additional emulsifying agent is required.

These compounds, which are nicotinium salts, may be represented by the general formula

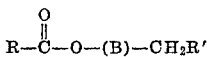

wherein R is an alkyl group containing from 1 to 17 carbon atoms, inclusive; B is nicotine; and R' is a monovalent member of the group consisting of H, alkyl, and aryl.

The soap-like properties of this class of compounds are dependent upon the size of R and R'. A pronounced detergent action in an aqueous medium is observed when either R or R' is a long-chain alkyl group, such as undecyl, pentadecyl, or heptadecyl. Consequently, these compounds may be employed in aqueous spray emulsions without the addition of an emulsifying agent. In addition, they are non-volatile and consequently are not lost from plant surfaces by evaporation, as is nicotine.

These nicotinium salts are prepared according to this invention, in general, by reacting a nicotinium halide with a metallic salt of an aliphatic acid containing from 2 to 18 carbon atoms. The type of nicotinium halide suitable for this reaction is represented by the following formula:

wherein X is chlorine, bromine, or iodine; B is nicotine; and R is a member of the group consisting of H, an alkyl group containing from 1 to 17 carbon atoms, inclusive, an aryl group, and a substituted aryl group. The aryl group may be mono- or poly-substituted with halogen, the nitro group, or alkyl groups.

Although these compounds can be most advantageously employed in aqueous carriers for spraying purposes, dry diluents may also be employed as the carriers. For example, suitable insecticidal dusts may be prepared by incorporating the dry nicotinium salts in such carriers as pyrophyllite, bentonite, kieselguhr, and so forth.

The following examples will serve to further illustrate the nature of the invention:

Example I

A mixture consisting of 40 parts sodium stearate, 40 parts benzyl nicotinium chloride and 100 parts anhydrous ethanol was stirred and boiled for 16 hours. The ethanol was then removed by distillation and the residue was thrice extracted with diethyl ether. Benzyl nicotinium stearate was obtained in good yield from the ether extract by distilling the volatile solvent. The dried residue was found to contain 5.45% nitrogen which is in good agreement with the theoretical value of 5.22% for nitrogen in benzyl nicotinium stearate.

Benzyl nicotinium palmitate, benzyl nicotinium oleate, and p-nitrobenzyl nicotinium palmitate were prepared by a similar procedure. All these compounds were soft, wax-like products possessing soap-like characteristics in aqueous dispersion.

*Example II*

A mixture consisting of 42.3 parts of octadecyl nicotinium bromide, 7 parts of sodium acetate and 100 parts of anhydrous ethyl alcohol was boiled for 16 hours. The reaction mixture was stirred continuously during this period of heating. The ethyl alcohol was removed by distillation and the residue was extracted several times with petroleum ether. Octadecyl nicotinium acetate was obtained in excellent yield by evaporation of the petroleum ether. The vacuum dried product contained 5.79% nitrogen which is in good agreement with the theoretical value of 5.90% for nitrogen in octadecyl nicotinium acetate.

Methyl nicotinium stearate, octadecyl nicotinium valerate, and octadecyl nicotinium laurate were prepared by a similar procedure. These products, which are soft and wax-like at room temperature, disperse in water to produce solutions of high surface activity.

Having thus described our invention, we claim:

1. A compound of the formula

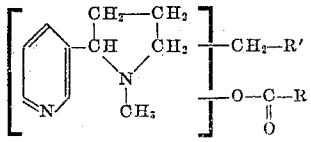

wherein R is an alkyl group containing from 1 to 17 carbon atoms, R' is a member selected from the group consisting of H, alkyl, and an aryl compound of the benzene series, and wherein the RCOO— and R'CH2— groups are both linked to the same nitrogen atom of the nicotine molecule.

2. Benzyl nicotinium stearate of the formula

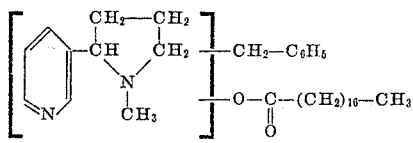

wherein the benzyl and stearoyl groups are both linked to the same nitrogen atom of the nicotine molecule.

3. Octadecyl nicotinium acetate of the formula

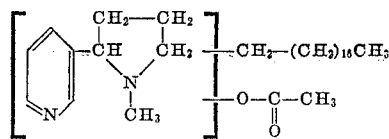

wherein the octadecyl and acetyl groups are both linked to the same nitrogen atom of the nicotine molecule.

4. Octadecyl nicotinium laurate of the formula

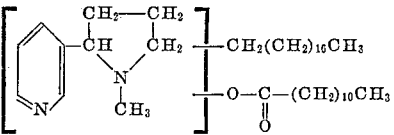

wherein the octadecyl and the lauroyl groups are both linked to the same nitrogen atom of the nicotine molecule.

5. A process comprising reacting a nicotinium halide with an alkali metal salt of an aliphatic acid containing from 2 to 18 carbon atoms, inclusive, to form a compound having the formula

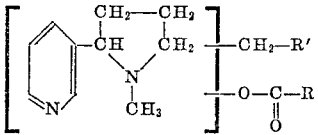

wherein R is an alkyl group containing from 1 to 17 carbon atoms, R' is a member selected from the group consisting of H, alkyl, and an aryl compound of the benzene series, and wherein the RCOO— and R'CH2— groups are both linked to the same nitrogen atom of the nicotine molecule.

CHARLES F. WOODWARD.
LEOPOLD WEIL.

REFERENCES CITED

The following references are of record in the file of this patent:

UNITED STATES PATENTS

| Number | Name | Date |
| --- | --- | --- |
| 1,534,325 | Hoyt | Apr. 21, 1925 |
| 2,048,885 | Oakshott | July 28, 1936 |
| 2,134,917 | Harris | Nov. 1, 1938 |
| 2,139,839 | McKinney | Dec. 13, 1938 |

OTHER REFERENCES

Heilbron, Dictionary of Organic Compounds, III, 1943 (N. Y. Oxford Press) pp. 60, 61, and 557 (Copy in Division 59).